TAPE RECORDERS

Filed Oct. 21, 1954 2 Sheets-Sheet 1

INVENTOR
COLIN B. DALE
BY Paul Kolisch
ATTORNEY

INVENTOR
COLIN B. DALE
BY Paul Kolisch
ATTORNEY

1

2,821,575

TAPE RECORDERS

Colin B. Dale, Oak Park, Ill., assignor to Webcor, Inc., a corporation of Illinois Application October 21, 1954, Serial No. 463,639

9 Claims. (Cl. 179—100.2)

The present invention relates to new and useful improvements in magnetic recorders, and more particularly to the simplification in the construction and assembly of magnetic tape recorders.

It is the object of the present invention to provide a tape recorder in which the customary functions required for effecting proper operation and control are performed without the use of clutches, rubber tired takeups, screw machine parts, rubber tired fly wheels, movably supported motors and the like by means of an extremely simple and compact mechanism of minimum weight within a structure which is approximately 10″ wide, 8″ deep, and 6¾″ high.

Another object of the present invention is to provide a compact, light weight tape recorder in which, in addition to the customary functions, means are provided for moving the tape at 1 of 3 speeds (e. g. 7½, 3¾ and 1⅞ inches) and in which monitoring and volume level setting can be accomplished.

A further object of the invention is to provide a tape recorder of the character described, wherein a wide, unobstructed clearance path is provided between the tape feeding elements, when in inactive position, whereby the tape may be readily positioned therebetween by an operator, preparatory to a recording operation.

The novel features characteristic of the invention are set forth with particularity in the appended claims. The invention itself however, both as to its organization and its method of operation, together with additional objects and advantages thereof, will be understood from the following description of a specific embodiment, when read in connection with the accompanying drawing, in which:

Figures 1, 4, 5:
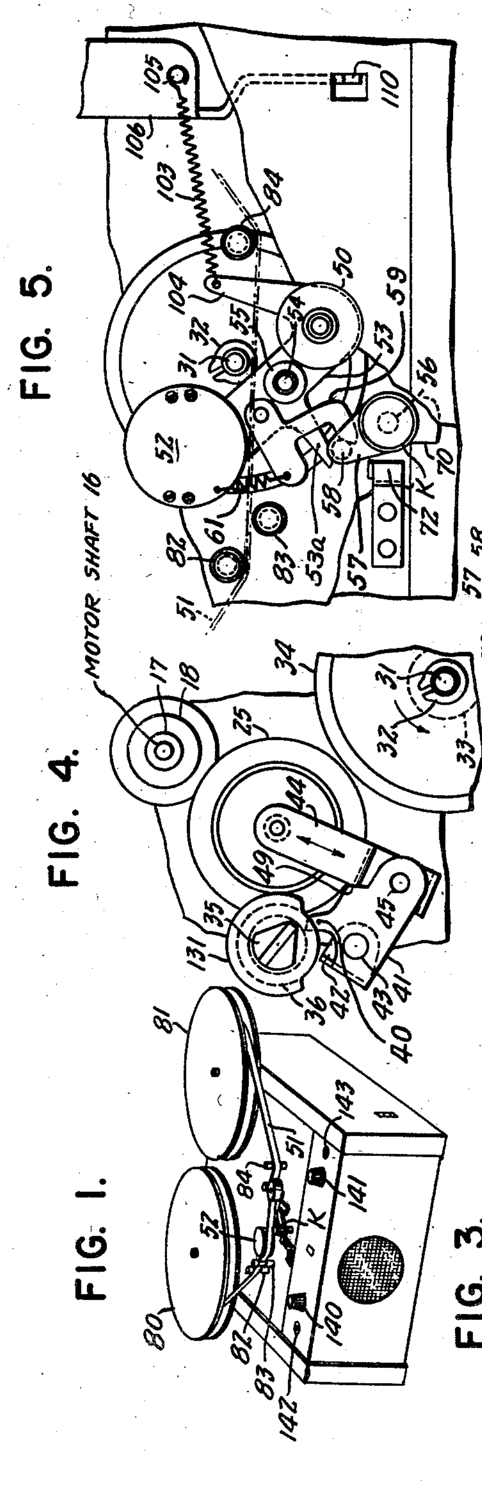
Fig. 1 is a perspective view illustrating a magnetic tape recorder constructed in accordance with the invention.
Fig. 4 is a fragmentary top plan view illustrating an idler wheel and correlated control means for shifting the idler wheel into and out of engagement with an upstanding motor shaft remaining in constant engagement with a fly wheel of a conventional capstan.
Fig. 5 is a similar view of a transducer unit and pressure roller as correlated with a capstan drive illustrating the non-operative position thereof with respect to a record tape as normally threaded therebetween.

Referring to the drawings:

Power is derived from an electric motor 10 having a shaft 11. The motor is suspended from a plate 12 by means of four rubber grommets 13 through which it is attached to a supporting bracket 14 which in turn is fastened to the underside of top plate 15 of the device. The upper portion of the shaft 11 projects within the bracket

2

14 and there terminates in an end 16 on which suitable driving diameters 17, 18 and 19 and 20 are provided on the shaft 11. By means of the driving diameters 19 and 20 suitable speed may be imparted to a belt 21 which engages the diameter 20 and is held in position thereon by means of a collar 22 separating the drive surface 20 from the surface 19. The diameter 19 drives a belt 23 and the latter is confined between the collar 22 and a collar 24 separating the drive diameter 19 from the diameter 18, shown in contact with an idler 25. The rubber grommets 13 may be slipped into notches 26 formed in four corners of the top plate 12 so that a portion 27 of the rubber 13 will lie above the plate 12. A stud 28 is passed through the bracket 14 and thence through the entire body of the rubber bushing 13. The top 27 of the bushing is held against a washer 29 between it and the bottom face of the bracket 14. The lower end of the stud 28 holds the rubber bushing 13 in place by means of a C washer 30.

By means of the driving diameters 16, 17 and 18, the electric motor shaft 11 may cause the transmission of three recording or listening speeds of 7½, 3¾, and 1⅞ inches per second. The rotation of these diameters may be transmitted via the idler 25 which by means to be later described may be positioned in engagement with any one of these diameters.

A capstan shaft 31 projecting above the plate 15 is held in a bearing 33 which is below the plate 15, a washer 32 within a groove on the shaft 31 [preventing it from dropping out of the bearing 33]. A fly wheel 34, pressed on capstan shaft 31, is correlated with the bearing 33 and may be driven by means of the idler 25 in any one of the three positions of the idler into which as above stated the idler may be moved to engage one of the driving diameters 16 to 18 of the motor shaft 11. This is accomplished by means of a speed selector member 35 which is rotatably mounted on the top plate 15, and carries below the plate 15 an annular cam 36 having three dwells 37, 38 and 39. These dwells are engaged by a projecting finger 40 on a lever 41 which has a bent end 42 mounted on a pivot shaft 43 carried by and depending from the plate 15. By means of a coiled spring S disposed about the lower end portion of the shaft 43 with its uppermost convolution anchored to the lever 42, and its lowermost convolution anchored to the shaft 43, the lever 41 with its finger 40 is pushed upward and, therefore, the finger 40 is pushed into engagement with the cam 36. A second function of the spring is to swing the lever 41 around the pivot shaft 43 or tending to do so. Since the idler is mounted on an arm 44 which is pivotally mounted at 45 on the end of the lever 41, the rotation of the latter will tend at all times to press the idler 25 against the outer circumference of the fly wheel 34, and also against the pulleys 16, 17 or 18 on the upper end of the shaft 11, thus insuring good driving connection between the fly wheel and the driving shaft.

The speed selector member 35 is retained in the position into which it is set by means of a dished spring washer 46 staked to the member 35 and presenting radially extending fingers in frictional engagement with the top plate 15.

The three dwells 37, 38 and 39 on the cam 36 acting on the finger 40 insure that the idler 25 will not only be moved up and down to engage one or the other driving surfaces but that it will also be moved laterally to insure clearing the flanges that separate these driving surfaces. Let us assume, for instance, that the idler 25 is in engagement with the top diameter 16 of the driving shaft 11, at which time the finger 40 will be in engagement with dwell 39 on the cam 36. When it is required to shift down to a larger driving diameter on shaft 11, the speed selector 35 is adjusted to rotate the cam 36 in a counterclockwise direction. When this happens the finger 40 will ride down the slope 48 of the cam 36, and cause the lever 41 to swing about the pivot point 43 in a clockwise direction pulling, through the arm 44, the idler 25 away from the motor pulley while remaining in contact with the fly wheel 34. This motion will continue until the gap 49 between the two levers 41 and 44 closes after which the bracket 41 is pushed downward until the next dwell on cam 36 is engaged by the finger 40. At this time the torque of spring "S" exerts its influence to push the idler 25 against the motor pulley and fly wheel. Friction between the cam dwell 38 and the finger 40 is so slight that it is easily overcome by the coiled spring S. It will be obvious from the above how the idler may be moved into engagement with the next larger driving diameter 18.

When rotating the cam 36 in the opposite direction, the respective dwells thereon simply ride down on the finger 40 whereby the spring S is free to bias the bracket 41 upwardly, and the idler 25 thus moved from the largest driving diameter 18 to the smallest driving diameter 16 without swinging the idler 25 away from the motor shaft.

Figure 3:
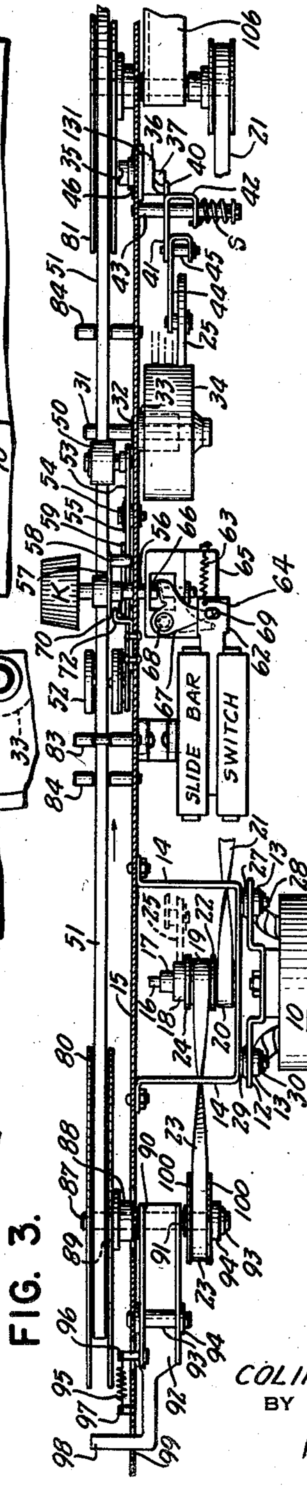
Fig. 3 is a linearly developed cross-sectional view following the lines 3—3 of Fig. 2.
Figure 6:
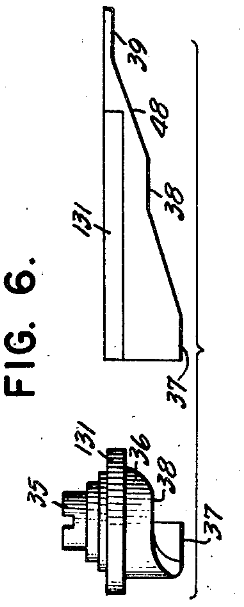
Fig. 6 is a side elevation and developed plan view of a speed selector cam member per se, illustrating the three dwells formed thereon.
Figure 2:
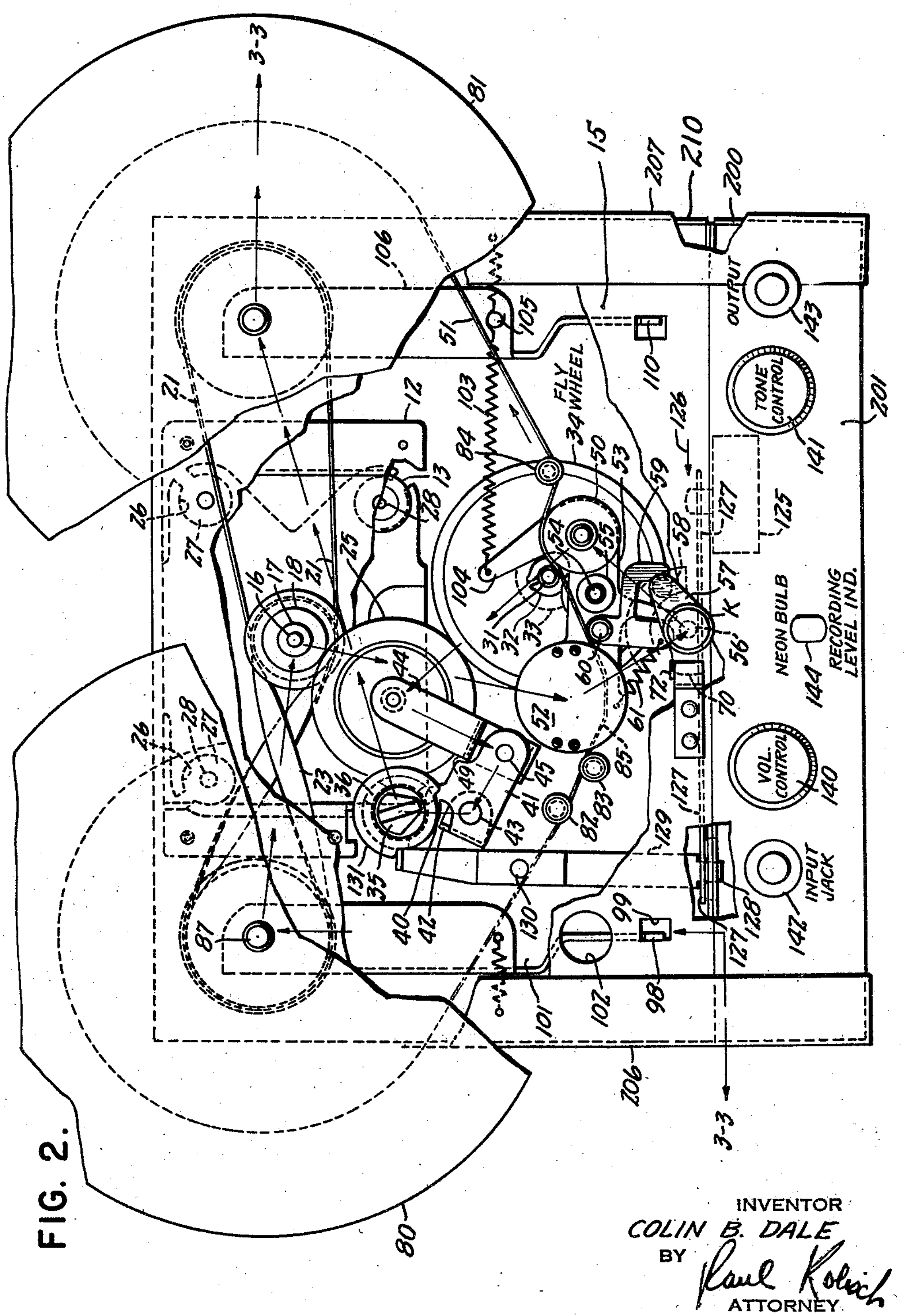
Fig. 2 is a top plan view of the improved tape recorder with parts broken away and illustrating the mechanism in recording position including a record tape.

As viewed in Figs. 2 and 4, the capstan 31 rotates in a counterclockwise direction. A rubber pressure roller 50 is pressed against the capstan 31, with the recording tape 51 between the two to cause said tape to travel from left to right at one of the speeds selected by the positioning of the idler 25. The pressure roller 50 and a recording head 52 are mounted on a plate 53 which is pivotally mounted on a stud 54 and held against vertical displacement by means of a dished spring washer 55. This assembly is shown in the top plan view of Fig. 2 in recording or reproducing position. When the assembly is pivoted in the opposite position as shown in Fig. 5 the plate 53 with the head 52 and the pressure roller 50 is disposed at an acute angle to the path of tape feed and thus out of the way permitting the tape to be readily inserted or removed. This movement of the plate assembly between the two positions is obtained by rotating a shaft 56 by means of a knob K. Shaft 56 carries a lever 57 which in turn carries an upstanding pin 58, the latter coacting with an extension finger **53*a*, formed on the pivoted plate 53, and the hooked end of a lever 59, pivoted on the plate 53, as at 60, and biased by a spring 61, to grip the pin 58 therebetween whereby the plate 53, mounting the recording head 52 and pressure roller 50, is moved into and out of operative position with respect to the tape 51 and capstan 31. The spring 61 also acts, when the plate 53 is in operative position, to urge the recording head 52 against the tape 51, and the pressure roller 50 toward the capstan 31** with a known, controlled pressure whereby the tape is maintained in frictional engagement with the capstan. When it is desired to change from listening to recording position then the following operations are performed:

A sliding bar switch 62 in the position shown has its contacts arranged to condition a circuit for sound reproduction. This switch is normally held in the position indicated in Fig. 3 by means of a spring 63 attached between a pin 64 projecting from the switch bar and a bracket 65. When it is desired to record, shaft 56 is pushed downward by applying hand pressure on knob K. A shoulder 66 on shaft 56 engages one arm of a lever 67 which is pivoted about a fulcrum 68 on bracket 65, and a pin 69 on another arm of lever 67, pivotally connected to the extended free end of the slidably mounted switch bar 62 whereby operation of lever 67 moves switch bar 62 to the left against the tension of spring 63 so as to close the electrical contacts required for the recording operation.

After pushing down the shaft 56 the knob K is rotated clockwise as before to swing the transducer head 52 and the pressure roller 50 into engagement with the tape 51, and the pressure roller against the capstan 31.

In order to prevent the spring from moving the shaft 56 upward after its rotation, a finger 70 provided on lever 57 is then in position under an adjacent stationary bracket 72, secured to the top plate 15, whereby such upward movement is prevented.

When loading the recording tape 51 into the machine, the left hand reel 80 is the supply reel and the right hand reel 81 is the take up reel. The end of the tape 51 which is completely wound on the reel 80 is passed between posts 82 and 83 and in front of post 84, all projecting from the top plate 15 of the machine. At this time there is a clear path between the head 52 and the pressure roller 50. The tape 51 is then attached to the take-up reel 81 in the normal manner.

It will be noted that a clear path is provided for placing the tape on the machine because both the head 52 and the pressure roller 50 are completely removed from the path of the tape 51 as best shown in Fig. 5.

After insertion of the tape 51, the plate 53 is swung into the position shown in Fig. 2, whereby the front face of the transducer head 52 is brought into engagement with the tape, as at 85, and the pressure roller 50 biased with the tape into driving engagement with the capstan 31. From the point of tangency, as at 86, the tape wraps around the post 84, and then is wound on the take up reel 81.

In order to keep the supply reel 80 taut a light tension is applied to the tape 51 before it reaches the head 52 in the following manner:

Shaft 87 on which the reel 80 is mounted with its supporting hub 88 pressed onto the shaft and with its drive pin 89 projecting into the reel 80, both support and drive the reel 80. This shaft 87 extends downward through bearings 90, 91 in a swingable bracket 92. The bracket pivots on a fixed pin 93 projecting downward from the top plate 15 and held in place thereon by means of a washer 94. A spring 95 is attached to a pin 96 riveted to the bracket 92. This spring is anchored to pin 97 projecting from the top plate 15 and keeps the bracket 92 in a fixed position because an extension 98 on the bracket projecting upward through an opening 99 in the top plate 15, is urged against one margin of this opening. It will be seen, therefore, that the shaft 87 is maintained at a fixed distance from the motor shaft 11 which in turn produces a predetermined amount of tension on belt 23 which passes over the driving diameter 19 on the motor shaft and a pulley 100 mounted on the lower end of the shaft 87.

The tension on the belt 23 is very light, and may be adjusted by bending the lever 92 at its neck which may be reached through a hole 102 cut through the top plate 15. With a slight tension on the belt 23, which is travelling in the direction of the arrow, it will be apparent that the tape will remain slightly taut as it is being pulled off the reel 80 in a direction opposite to that in which the belt 23 is attempting to drive the reel.

The right hand reel 81 as above stated must take up the tape as it comes off the capstan 31. The construction of this reel is identical with that of the left hand reel, with the following exceptions. The very light tension produced by the slight tautness of the belt 21 is increased, at the time that the tape is being driven by the capstan 31, by a spring 103 which is attached to lever arm 104 and a pin 105 riveted to bracket 106 corresponding to the bracket 92. When the arm 104 of the swinging lever 53, which is shown in the tape drive position, is swung around to the position shown in Fig. 5 in which the tape may be put in place, the spring 103 will be detensioned and exert no pull on the lever 106. At this time the tape will stand free in the machine and will not creep forward since the tautness of the driving belt 21 is very slight. However, as soon as the pressure roller 50 is pressed against the capstan and the arm 104 is swung into the recording position the spring 103 will be tensioned and will, via the bracket 106, cause the tightening of the belt 21 and deliver to the take up reel 81 an extra forward driving power to take up the tape with certainty.

When the pressure roller 50 is disengaged after having finished recording on or reproducing sound recorded on a reel of tape, it is necessary to rewind the tape back onto the supply spool 80. This means that the belt 23 must be tightened and this in turn is accomplished by pushing the extension 98 of the bracket 92 to the right. This will permit fast rewinding of the tape.

Similarly, the tape may be wound fast in a forward direction by tightening the belt 21 driving it, by similarly moving the bracket 106 via its upstanding end 110 projecting through the top plate 15 and corresponding in all respects to the upstanding end 98 of the bracket 92.

The electrical characteristics of the tape are such that high notes die off rapidly when the speed of recording is reduced. Therefore, it is desirable to change the amount of equalization when the speed is reduced from 7½ inches per second to 3¾ inches per second. This is accomplished by means of a switch 125 which is normally urged by a spring in the direction shown by the arrow. A bar 127 has a hole at one end which slips over the switch knob 126 and also a hole at its other end which slips over a narrow end 128 of a lever 129. The lever 129 is arranged to pivot about a rivet 130 whereby its opposite end rotates in a clockwise direction as shown in Fig. 2 against an outward extending cam surface 131 in such a manner that when the speed changing cam 36 is turned to the 7½″ speed position the lever and switch will be in the position shown and when the cam is turned to the 3¾ or 1⅞ speed position the knob 126 will be pushed to the right to perform the required electrical connections for additional electric current equlization for the two slower speeds.

Control knobs on top of the machine consist of volume control knob 140, tone control knob 141, input jack at 142 and output jack at 143. 144 is a neon lamp bulb for indicating the volume level of recording and reproduction.

The electrical components are assembled within an auxiliary frame 200 and the mechanical components within a main frame 210 comprising complementary chassis sections of which the plate 15 constitutes the top side of the main frame 210. The controls for the electrical equipment 140—143 are mounted on top of the auxiliary frame 200. The two chassis sections 200 and 210 are suitably fastened together so that the top side 201 of the frame 200 will be level with the top side 15 of the main frame 210, the lower edge of the frame 200 providing one support, and suitable legs, not shown, secured to the rear edge of the frame 210, providing the opposite support. Suitable cover plates 206 and 207 may be provided on the opposite side ends of the frame assembly which may, of course, be inserted as a unit within a suitable ornamental casing.

While the invention has been illustrated and described with respect to a preferred embodiment thereof, it is to be expressly understood that various changes and modifications may be made therein without departing from the inventive concept underlying the same. Therefore, the invention is not to be limited except insofar as is necessitated by the prior art and the scope of the appended claims.

I claim:

1. A magnetic tape recorder having a pair of rotatably mounted reels, means including an electric motor for selectively driving either of said reels, a capstan and guide means spaced intermediate said reels for maintaining a portion of a record tape between said reels in a predetermined path, a transducer and a pressure roller cooperating with the tape within said path, the combination of a common mounting structure for said transducer and pressure roller, means for fastening said structure allowing angular movement of said transducer and roller into and out of cooperative relation with the tape and capstan, and manually operable means for imparting to said mounting the angular movement.

2. A magnetic tape recorder, having a pair of rotatably mounted reels, means including an electric motor for selectively driving either of said reels, a switch in circuit with said motor, a capstan and guide means spaced intermediate said reels for maintaining a portion of a record tape between said reels in a predetermined path, a transducer and a pressure roller cooperating with the tape within said path, the combination of a common mounting structure for said transducer and pressure roller, a pivoted mounting for said structure allowing angular movement of said transducer and roller into and out of cooperative relation with the tape and capstan, and manually operable means for rotating said mounting about its pivot and for actuating said switch.

3. A magnetic tape recorder having a pair of rotatably mounted reels, means including an electric motor for selectively driving either of said reels, a capstan and guide means spaced intermediate said reels for maintaining a portion of a record tape between said reels in a predetermined path, a transducer and a pressure roller cooperating with the tape within said path, the combination of a plate member mounting at its ends said transducer and pressure roller in spaced relation, means pivotally mounting said plate member intermediate its ends to permit angular movement of said transducer and roller into and out of cooperative relation with the tape and capstan, respectively, and manually operable means for rotating said mounting about its pivot.

4. A magnetic tape recorder having a pair of rotatably mounted reels, means including an electric motor for selectively driving either of said reels, a capstan and guide means spaced intermediate said reels for maintaining a portion of a record tape between said reels in a predetermined path, a transducer and a pressure roller cooperating with the tape within said path, the combination of a common mounting structure for said transducer and pressure roller, a pivoted mounting for said structure allowing angular movement of said transducer and roller into and out of cooperative relation with the tape and capstan, respectively, spring means connected to said mounting structure tending to bias said transducer and roller out of cooperative relation with said tape and capstan, and manually operable means for rotating said mounting about its pivot.

5. A magnetic tape recorder, having a pair of rotatably mounted reels, means including an electric motor for selectively driving either of said reels, a capstan and guide means spaced intermediate said reels for maintaining a portion of a record tape between said reels in a predetermined path, a transducer and a pressure roller cooperating with a tape within said path, the combination of a common mounting structure for said transducer and pressure roller, a pivoted mounting for said structure allowing angular movement of said transducer and roller into and out of cooperative relation with the tape and and capstan, respectively, manually operable means for rotating said mounting about its pivot, the last named means including a pair of relatively yieldable members coactable with a crank member for rotating said mounting about its pivot and for maintaining said transducer and roller in and out of cooperative relation with said tape and capstan.

6. A magnetic tape recorder, having a pair of rotatably mounted reels, means including an electric motor for selectively driving either of said reels, a capstan and guide means spaced intermediate said reels for maintaining a portion of a record tape between said reels in a predetermined path, a transducer and a pressure roller cooperating with the tape within said path, the combination of a common mounting structure for said transducer and pressure roller, a pivoted mounting for said structure allowing angular movement of said transducer and roller into and out of cooperative relation with the tape capstan, respectively, spring means connected to said mounting structure tending to bias said transducer and roller out of cooperative relation with said tape and capstan, and manually operable over-center means pivotally coupled to said mounting structure for rotating said mounting about its pivot and for maintaining said transducer and roller in and out of cooperative relation with said tape and capstan against the action of said spring means.

7. A magnetic tape recorder having a pair of rotatable shafts each having a pulley secured thereon, a reel detachably mounted on each of said shafts for rotation therewith, a motor including a drive shaft having a plurality of different driving diameters thereon including a dual pulley adjacent thereto, flexible means connecting each of said reel puleys with said dual pulley, means rendering either of said flexible means slack whereby the reels are adapted for reeling a record tape to and from either of said reels, spaced means intermediate said reels for guiding a portion of a record tape between said reels in a predetermined path, a capstan disposed intermediate and to one side of said path, a spring biased idler wheel in engagement with said capstan axially adjustable for selective engagement with one of the driving diameters on said drive shaft, a transducer and a pressure roller cooperating with the tape within said path, a common mounting structure for said transducer and pressure roller, a pivoted mounting for said structure allowing angular movement of said transducer and roller into and out of cooperative relation with the tape and capstan, and manually operable means for rotating said mounting about its pivot.

8. A magnetic tape recorder having a pair of rotatable shafts each having a pulley secured thereon, a reel detachably mounted on each of said shafts for rotation therewith, a motor including a drive shaft having a plurality of different driving diameters thereon, means for selectively driving either of said reel pulleys in opposite directions whereby to reel a recorded tape to and from either of said reels, spaced means intermediate said reels for guiding a portion of a recorded tape between said reels in a predetermined path, a capstan disposed intermediate and to one side of said path, a spring biased idler wheel in engagement with said capstan axially adjustable for selective engagement with one of said driving diameters on said drive shaft, common means pivotally mounting a transducer and a pressure roller substantially opposite said capstan for angular movement relative thereto, and manually operable means for controlling said last named means whereby said transducer and roller are positionable respectively on opposite sides of and partially in said path parallel therewith.

9. A magnetic tape recorder having a pair of rotatable shafts each having a pulley secured thereon, a reel detachably mounted on each of said shafts for rotation therewith, a motor including a drive shaft, means for selectively coupling either of said rotatable shafts to said drive shaft whereby to reel a record tape to and from either of said reels spaced means intermediate said reels for guiding a portion of a record tape between the reels in a predetermined path, a capstan including a flywheel disposed intermediate and to one side of said path, a spring biased idler wheel coupling said flywheel to said drive shaft, common means pivotally mounting a transducer and a pressure roller on the opposite side of said path substantially opposite said capstan for angular movement relative thereto, and manually operable means for controlling said last named means to position said transducer and roller respectively on opposite sides of said path in inoperative position and partially in said path parallel therewith in operative position and in cooperative engagement with said record tape and capstan.

References Cited in the file of this patent

UNITED STATES PATENTS 2,620,404 Pond ------------------ Dec. 2, 1952

OTHER REFERENCES

Magnetic Recording, S. S. Begun, 1949, pages 173–176. (Available in Library.)